Patented Dec. 13, 1938

2,139,669

UNITED STATES PATENT OFFICE 2,139,669

SULPHATION OF CHLORHYDRINS

Hyym E. Buc, Roselle, N. J., assignor to Standard Oil Development Company, a corporation of Delaware No Drawing. Application September 15, 1933, Serial No. 689,564

12 Claims. (Cl. 260—458)

This invention deals with the preparation of superior detergents and wetting agents. More specifically, it involves the preparation of sulphated chlorhydrins useful for laundering purposes, as assisting agents in dyeing, and the like.

The products obtained according to this invention possess very superior wetting and detergent properties. They are prepared by reacting an alkaline material and an organic sulphonic body such as sulphated chlorhydrins, preferably of high molecular weight. Unsaturated compounds such as olefines obtained by cracking waxes in the liquid phase at 600–1000° F. at 0–200 atmospheres or at 500–800° F. in vapor phase, diolefines, high molecular weight alpha olefines, dehydration products of alcohols such as octadecyl alcohol, dechlorinated chlor-wax, cracked petroleum fractions, cetene, and similar straight chain olefines, and the like, may be used as raw materials, although it is particularly desirable to use olefinic compounds having 6, 8, 10, 12, or even as high as 20 or 30 carbon atoms. These may be converted into the chlorhydrins by known methods, as for instance by the action of mild hypochlorous acid, and the like, but the most effective method consists in employing chlor-urea as the reagent. In this case the olefine is agitated at about 0–50° C., preferably at 20° C., with a solution of chlor-urea in acetic acid of approximately 5% strength, the chlorhydrin formed being removed as a separate top layer.

The next step consists in sulphating the hydroxy group with a sulphating agent such as sulphuric acid, chlor-sulphonic acid, sulphur trioxide, and the like. For this purpose phosphoric acid is considered as an equivalent of sulphuric acid. The reaction is carried to or even beyond the point of sulphation. However, it is preferable to treat the chlorhydrin with 66° Bé. sulphuric acid at about −10 to 25° C., preferably at 0° C., so as to obtain substantially complete sulphation, and then to neutralize with an alkali such as sodium or potassium hydroxide. Other alkaline materials such as carbonates, amines, hydroxyamines, and the like may also be used. The resulting product is separated by decantation of the supernatant liquid after the addition of a small amount of alcohol, and dried.

The reactions involved could probably be expressed by the following equations:

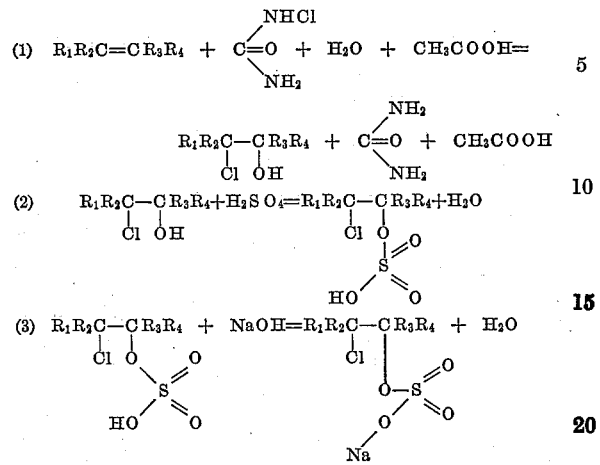

Here $R_1$, $R_2$, $R_3$, and $R_4$ may be alkyl or aryl groups, hydrogen, halogen, amide, carboxyl, sulphonic acid groups, and the like.

The following examples are given to illustrate the operation of the process, but the invention is not restricted to the specific cases given:

Example 1

Hexadecene obtained by cracking spermaceti, was converted to the chlorhydrin by reaction with chlor-urea. 100 g. of this hexadecene chlorhydrin was then sulphated at 25° C., with 66° Bé. sulphuric acid until equilibrium was maintained. The reaction mixture was neutralized with sodium hydroxide, and 50 cc. of isopropyl alcohol added, whereby the neutralized reaction product in alcohol formed a middle layer with unreacted chlorhydrin on the top and aqueous salt solution on the bottom. Evaporation of the alcohol solution produced 34 g. of the neutralized reaction product, an aqueous solution of which had a wetting-out rate twice as great as the sodium neutralized sulphuric ester of lauryl alcohol.

Example 2

500 g. of chlorparaffin wax (chlorine content 12%) was dechlorinated by steam distillation over barium chloride. The resulting mixture of olefines and paraffines was reacted with chlor-urea to convert the olefines to chlorhydrins. On reaction with sulphuric acid, as carried out in Example 1, there was recovered in the same way, 102 g. of a neutralized reaction product, (care being taken to add sufficient alcohol to effect separation). This product was more soap-like than the sodium neutralized sulphuric ester of lauryl alcohol.

*Example 3*

Paraffin wax was cracked at atmospheric pressure in liquid phase at 600–900° F. to produce about 30% boiling between 400° F. to 600° F. On conversion of the olefines in this fraction to chlorhydrins followed by sulphation at 0° C., and neutralization as in Example 1, there was produced a 25% yield (on the distillate) of a powerful detergent product. Tests show this product to have a wetting-out rate three times that of the sodium neutralized sulphuric ester of lauryl alcohol.

It will be noted that the compounds prepared according to this invention possess much better wetting-out properties than any of the samples tested for comparison. Furthermore the detergent qualities of the improved compounds are so much better that a more dilute solution may be used more effectively. This material has been found to be exceptionally well suited as a hard water soap or as an ingredient in dry cleaning soaps, liquid soaps, dye baths, scouring powders, soap flakes, and the like. For instance, small amounts, say 0.5 to 30% of this sulpho product may be added to the usual sodium or potassium fatty acid soaps to improve the wetting and detergent properties of the latter.

An added feature of these products is their neutral character, making them readily suitable for both neutral and alkaline textile baths, hand lotions and cleaners, hard water soaps, and the like. Additional materials such as perfumes, fillers, abrasives, soaps of sulphated alcohols, petroleum sulphonates, inorganic salts, organic solvents, etc., may also be added.

This invention is not limited by any theory of the operation of any step, nor of any particular example illustrating its operation, but only by the following claims in which I wish to claim all novelty inherent in the invention.

I claim:

1. A reaction product of at least 6 carbon atoms comprising essentially a neutralized chlorhydrin ester, said chlorhydrin ester being formed by sulphating at a temperature not over about 25° C. a chlorhydrin secured from olefines of the type derived when cracking petroleum wax.

2. A reaction product according to claim 1 in which the chlorhydrin contains 6 to 30 carbon atoms.

3. A reaction product according to claim 1 in which the chlorhydrin contains substantially a straight chain of at least six carbon atoms.

4. A process for producing a compound having wetting and detergent properties comprising converting an olefine of at least six carbon atoms into a chlorhydrin, sulphating the chlorhydrin at a temperature not over about 25° C. and then neutralizing the sulphate.

5. A process for producing a compound having wetting and detergent properties according to claim 4 in which the neutralization of the sulphate is affected by an amine.

6. A process for producing a compound having wetting and detergent properties comprising treating with chlor-urea an olefine of 8 to 20 carbon atoms obtained by cracking waxy materials, sulphating the chlorhydrin so formed with sulphuric acid at −10 to 25° C. and neutralizing the sulphate with a basic substance of the class consisting of alkali bases and amines.

7. Process in accordance with claim 6 in which said chlorhydrin is derived from olefines of the type secured by cracking petroleum wax.

8. Process in accordance with claim 6 in which said chlorhydrin is derived from a straight chain olefine.

9. Product secured by the process defined by claim 6.

10. A reaction product of at least 6 carbon atoms comprising essentially a neutralized chlorhydrin ester, said chlorhydrin ester being formed by sulphating at a temperature not over about 25° C. a chlorhydrin secured from olefines of the type derived when cracking petroleum wax.

11. A reaction product of at least 6 carbon atoms comprising essentially a neutralized chlorhydrin ester, said chlorhydrin ester being formed by sulphating at a temperature not over about 25° C. a chlorhydrin secured from olefines having at least 6 carbon atoms per molecule.

12. A reaction product of at least 6 carbon atoms comprising essentially a neutralized chlorhydrin ester, said chlorhydrin ester being formed by sulphating at a temperature not over about 25° C. a chlorhydrin in which the chlorine and the hydroxy groups are attached to adjacent carbon atoms, said chlorhydrin being derived from olefines having at least 6 carbon atoms per molecule.

HYYM E. BUC.